US008929356B2

(12) United States Patent
Pandey et al.

(10) Patent No.: US 8,929,356 B2
(45) Date of Patent: Jan. 6, 2015

(54) MOBILE USER IDENTIFICATION AND TRACKING FOR LOAD BALANCING IN PACKET PROCESSING SYSTEMS

(71) Applicants: Shardendu Pandey, Cedar Park, TX (US); Stefan Johansson, Round Rock, TX (US); Robin O'Connor, Austin, TX (US); Keith E. Cheney, Austin, TX (US)

(72) Inventors: Shardendu Pandey, Cedar Park, TX (US); Stefan Johansson, Round Rock, TX (US); Robin O'Connor, Austin, TX (US); Keith E. Cheney, Austin, TX (US)

(73) Assignee: Anue Systems, Inc., Austin, TX (US)

( * ) Notice: Subject to any disclaimer, the term of this patent is extended or adjusted under 35 U.S.C. 154(b) by 156 days.

(21) Appl. No.: 13/759,407

(22) Filed: Feb. 5, 2013

(65) Prior Publication Data

US 2014/0219100 A1 Aug. 7, 2014

(51) Int. Cl.
*H04L 12/28* (2006.01)
*H04W 28/08* (2009.01)
*H04W 40/00* (2009.01)

(52) U.S. Cl.
CPC .............. *H04W 28/08* (2013.01); *H04W 40/00* (2013.01)
USPC .......................................................... 370/351

(58) Field of Classification Search
CPC ............................... H04W 40/00; H04W 28/08
USPC .................................................. 370/351, 328
See application file for complete search history.

(56) References Cited

U.S. PATENT DOCUMENTS

| | | | |
|---|---|---|---|
| 6,763,018 B1 | 7/2004 | Puthiyandyil et al. | |
| 7,260,638 B2 | 8/2007 | Crosbie | |
| 7,328,009 B2 | 2/2008 | Takeda et al. | |
| 7,567,504 B2 | 7/2009 | Darling et al. | |
| 7,594,009 B2 | 9/2009 | Triulzi et al. | |
| 7,702,310 B1 | 4/2010 | Parks et al. | |
| 7,742,406 B1 * | 6/2010 | Muppala | 370/230 |
| 7,969,900 B2 | 6/2011 | Abdo et al. | |
| 8,027,323 B2 | 9/2011 | Aso et al. | |
| 8,059,532 B2 | 11/2011 | Riddle et al. | |
| 8,270,942 B2 | 9/2012 | Zabawskyj et al. | |
| 8,279,752 B1 | 10/2012 | Busch et al. | |
| 8,391,174 B2 * | 3/2013 | Schlansker et al. | 370/252 |
| 2005/0169270 A1 * | 8/2005 | Mutou et al. | 370/390 |
| 2006/0002304 A1 * | 1/2006 | Ashwood-Smith | 370/238 |
| 2013/0279371 A1 * | 10/2013 | Takashima et al. | 370/254 |
| 2014/0056300 A1 * | 2/2014 | Zhao et al. | 370/392 |

* cited by examiner

*Primary Examiner* — Albert T Chou
(74) *Attorney, Agent, or Firm* — Egan, Peterman & Enders LLP.

(57) ABSTRACT

Systems and methods are disclosed for mobile user identification and tracking for load balancing in packet processing systems. Packet processing systems, such as network tool optimizer (NTO) systems, are configured to receive packets associated with multiple mobile users, to extract user identification information from the packets, to store identity binding information for the mobile users, to track changes in identification information for mobile users within a communication system by analyzing control information within packets for the communication system, and to forward packets to one or more tool ports associated with the packet processing system. The packet processing systems disclosed thereby allow for user packets to be identified and sent to the same load-balanced network tool, even though the user identification information changes over time within the communication system. The disclosed embodiments are useful for a wide variety of mobile and/or non-mobile communication systems and related communication protocols.

25 Claims, 7 Drawing Sheets

| REC ID | UE ID INFO | FILTERS | TOOL PORTS |
|---|---|---|---|
| | UE BINDINGS | | |
| 1 | UE1 | F1 | T3 |
| 2 | UE1 | F2 | T3 |
| 3 | UE2 | F3 | T1 |
| 4 | UE3 | F4 | T2 |
| ⋮ | ⋮ | ⋮ | ⋮ |
| N | UE(N) | F(N) | T(N) |

MOBILE USER IDENTIFICATION AND TRACKING FOR LOAD BALANCING IN PACKET PROCESSING SYSTEMS

TECHNICAL FIELD OF THE INVENTION

This invention relates to processing and forwarding network packets to network analysis tools using packet processing systems and, more particularly, to processing and forwarding such network packets associated with mobile user equipment within a communication system.

BACKGROUND

Packet processing systems utilize network routing or switch integrated circuits (ICs) to forward packets from input or ingress ports to output or egress ports. In particular, these integrated circuits are able to forward network packets from an ingress port to one or more egress ports based upon information contained within selected fields within the input packets. This information can include user identification information, such as source and destination address information, as well as other information. However, for mobile user devices within a communication system, such as a system that uses the GPRS tunneling protocol (GTP) for packets, the device identification information for user equipment can change as the mobile user equipment moves within the communication system. For example, when a mobile handset moves from being serviced by one base station to another base station within a cellular communication network, the identification information for that mobile handset will often change as the handover occurs between the two base stations.

Network analysis tools are used within communication networks to monitor network traffic and to detect events, such as undesired network intrusions. When multiple network analysis tools are being utilized in parallel to monitor network traffic, it is often desirable to load balance the network traffic among the network analysis tools. Further, network analysis tools often desire to receive all packets associated with a particular communication session for a mobile user device in order to enhance the ability of the network analysis tool to provide effective monitoring of the network traffic. For example, as mobile user equipment moves through a communication network, it is desirable for all the network traffic associated with that user equipment to be identified and forwarded to the same network analysis tool. Currently, however, this result is difficult to achieve, if not impossible, for load balanced systems when mobile user devices move between base stations, particularly within a GTP-based system or other communication systems that utilize a tunneling protocol for packet communications within the communication system.

Figure 1:
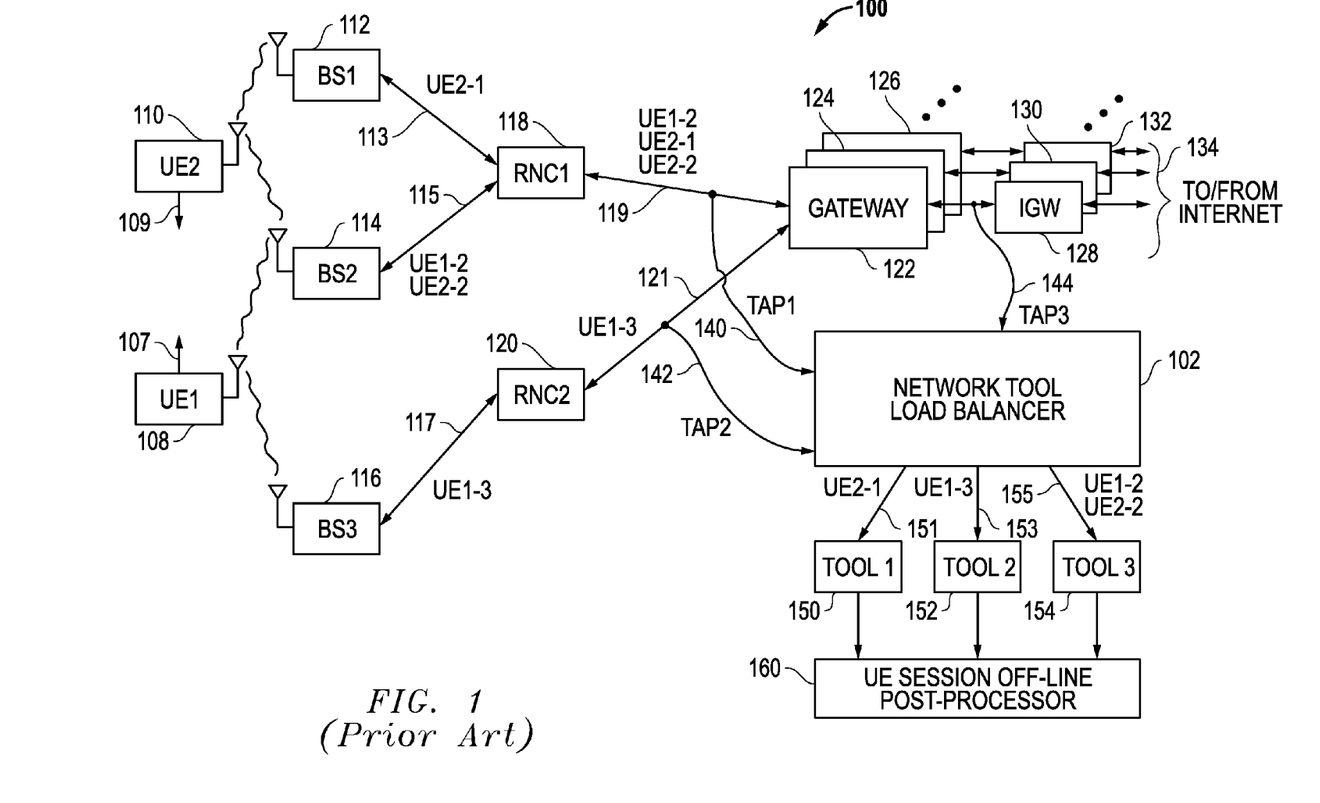
FIG. 1 (Prior Art) is a block diagram of an embodiment for a communication system including traditional load balancing for network tools with off-line subscriber identification processing.

FIG. 1 (Prior Art) is a block diagram of an embodiment 100 for a communication system including a traditional network tool load balancer 102. The communication system depicted includes three base stations (BS1, BS2, BS3) 112, 114, and 116 and is designed in part for use with mobile user devices. As depicted, first user equipment (UE1) 108 and second user equipment (UE2) 110 are users within the communication system and are mobile within the communication system. Base station (BS1) 112 and base station (BS2) 114 are coupled to a first radio network controller (RNC1) 118. Base station (BS3) 120 is coupled to a second radio network controller (RNC2) 120. The two radio network controllers (RNC1, RNC2) 118 and 120 are coupled to gateway 122, which is in turn coupled to an internet gateway (IGW) 128. The IGW 128 provides packet communications to and from the internet 134. Further it is noted that additional base stations, radio network controllers, gateways, and internet gateways can be provided within the communication system, as desired. For example, additional gateways 124 and 126 are depicted that can be connected to additional base stations and radio network controllers, and additional internet gateways 130 and 132 are also depicted that can be coupled to these additional gateways and the internet 134.

For the embodiment depicted, the load balancer 102 receives network packets from three passive network taps represented by a first tap (TAP1) 140, a second tap (TAP2) 142, and a third tap (TAPS) 144. The load balancer 102 is coupled to a first network tool (TOOL1) 150 through connection 151, a second network tool (TOOL2) 152 through connection 153, and a third network tool (TOOLS) 154 through connection 155. The network analysis tools 152, 154, and 156 are also coupled to a user equipment (UE) session off-line post-processor 160. The UE session off-line post-processor 160 is used to post-process mobile communication traffic and to analyze UE sessions due to the inability of the load balancer 102 to identify and separate UE sessions in real-time. Post-processing is required to determine which packets belong to which UEs, and these packets can be spread across different network tools.

It is noted that FIG. 1 (Prior Art) represents a simplified version of a mobile communication system, such as an LTE (Long Term Evolution) communication system that utilizes GTP-based packets, and many more users, base stations, RNCs, gateways, and/or other infrastructure would be included in an actual mobile communication system implementation. As such, many more interfaces and communication links would likely be tapped and/or monitored within the system. The load balancer 102, therefore, would likely receive significantly larger number of packet streams from taps and monitors than the three taps (TAP1, TAP2, TAP3) 140, 142, and 144 represented in FIG. 1A (Prior Art). As the numbers of user sessions and related packets grow, the post-processing required by UE session off-line post-processor 160 becomes significant and more complex.

The inability of load balancer 102 to perform real-time determination of the UE source can be further explained by looking to the UE communications within embodiment 100 as the UEs move between base stations. Looking first to the first user equipment (UE1) 108, UE1 108 is depicted as moving between being serviced by the third base station (BS3) 116 to being serviced by the second base station (BS2) 114, as indicated by the arrow 107. Initially, therefore, packets from UE1 108 are received by BS3 116 and sent to RNC2 120 through connection 117. The UE1-3 designation for connection 117 represent a packet stream associated with UE1 108 for a communication session. These UE1-3 packets are then forwarded by RNC2 120 to gateway 122 through connection 121. From the gateway 122, these packets make their way to the Internet 134 through IGW 128. Return packets can travel back through the IGW 128, gateway 122, RNC2 120, and BS3 116 to be received by UE1 108.

When the UE1 108 moves within the communication system according to arrow 107, however, a handover can occur from BS3 116 to BS2 114. Once this occurs, BS2 114 now services packet communications with UE1 108. As such, packets from UE1 108 are now received by BS2 114 and are provided to RNC1 118 through connection 115, as indicated by the UE1-2 designation. These packets are then forwarded by RNC1 118 to gateway 122 through connection 119. From the gateway 122, these packets can make their way to the Internet 134 through IGW 128. Return packets can travel back trough the IGW 128, gateway 122, RNC1 118, and BS2 114 to be received by UE1 108.

Looking next to the second user equipment (UE2) 110, UE2 110 is depicted as moving between being serviced by the first base station (BS1) 111 to being serviced by the second base station (BS2) 114, as indicated by the arrow 109. Initially, therefore, packets from UE2 110 are received by BS1 112 and sent to RNC1 118 through connection 113. The UE2-1 designation for connection 113 represents to packet stream associated with UE2 110. The UE2-1 packets are then forwarded by RNC1 118 to gateway 122 through connection 119. From the gateway 122, these packets make their way to the Internet 134 through IGW 128. Return packets can travel back trough the IGW 128, gateway 122, RNC1 118, and BS1 112 to be received by UE2 110.

When the UE2 110 moves within the communication system according to arrow 109, however, a handover can occur from BS1 112 to BS2 114. Once this occurs, BS2 114 now services packet communications with UE2 110, as well as packet communications with UE1 108. As such, packets from UE2 110 are now received by BS2 114 and provided to RNC1 118 through connection 115, as indicated by the UE2-2 designation. These packets are then forwarded by RNC1 118 to gateway 122 through connection 119. From the gateway 122, these packets can make their way to the Internet 134 through IGW 128. Return packets can travel back trough the IGW 128, gateway 122, RNC1 118, and BS2 114 to be received by UE2 110.

The movement of the UE1 108 and UE2 110 make it difficult to determine the particular source for the different packet streams UE1-3, UE1-2, UE2-1, and UE2-2. As UE1 108 and UE2 110 move and are handed over to different base stations, the identity information for UE1 108 and UE2 110 within transmitted packets will change. These identification changes and differences will cause the network tool load balancer 102 to be unable to determine the source of the packets. In particular, the different packet streams (e.g., UE1-3, UE1-2, UE2-1, and UE2-2) will look to the load balancer 102 as if they are unassociated packet streams.

When load balancer 102 balances network traffic among the network tools (TOOL1, TOOL2, TOOL3) 150, 152, and 154, the load balancer 102 will do so without recognizing that the different packet streams for UE1 108 and UE2 110 are from the same source device. As depicted, load balancer 102 has balanced the different packet streams by providing packet stream UE2-1 to first network tool (TOOL1) 150, by providing packet stream UE1-3 to second network tool (TOOL2) 152, and by providing packet streams UE1-2 and UE2-2 to third network tool (TOOL3) 154. These tools 152, 154, and 156 will then process these packet streams as separate packet streams.

Because of the inability of the load balancer 102 to identify the source of the input packets, a UE session off-line post-processor 160 is required to determine which packets belong to which UE. The post-processor 160 performs off-line post-processing of the packets received by all three tools 152, 154, and 156 to try to determine source identification information and match different packet streams or sessions with particular UEs. This post-processing, however, is complex and cumbersome, and it yields after-the-fact results that are not helpful for real-time monitoring of mobile network traffic.

In an effort to track user identity within a communication system having mobile user devices that move within the system, a hash function technique has been applied in prior solutions to identify user devices. For this technique, a hash function is applied to fields within a packet, and the result of the hash function is used to direct packets to an output or egress port. For example, a hash function can be applied to identification fields within packets, such as source/destination IP addresses, tunnel endpoint identifiers (TEID), UDP (user datagram protocol) port identifiers, and/or other packet identification fields. The resulting hash values are then stored as user identifiers and used to direct future packets to common egress ports. This hash function technique, however, does not keep track of changes in UE identification information due to mobility of the UE within the communication system. Thus, where IP addresses, TEIDs, and/or other identification information change for UEs that travel across geographic/coverage areas, such as UE1 108 and UE2 110 above, the hash function technique will fail to deliver new packets for a particular user to the same egress tool part as previous packets.

Other solutions have applied active in-line load balancers that identify user devices. This active in-line load balancing technique uses a small number of control plane packets to select one of multiple gateways to process packets. In-line load balancers that can be used for this technique include, for example, SSGN (serving GPRS support node) load balancers and GGSN (gateway GPRS support node) load balancers. This in-line balancing technique is only useful, however, where the load balancer can be placed in-line with the actual user traffic. This approach looks at create session requests within the in-line traffic. Upon receiving these requests, the in-line load balancer selects a new gateway processor. Subsequent communications then occur between the chosen gateway and the source. For passive monitoring devices, however, a load balancer cannot change the destination gateway, for example, of a GTP (GPRS tunneling protocol) session. As such, this prior active in-line load balancing technique is not useful for passive monitoring applications.

SUMMARY OF THE INVENTION

Systems and methods are disclosed for mobile user identification and tracking for load balancing in packet processing systems. Packet processing systems are configured to receive packets associated with multiple mobile users, to extract user identification information from the packets, to store identity binding information for mobile users, to track changes in identification information for mobile users within a communication system by analyzing control information within packets for the communication system, and to forward packets to one or more tool ports associated with the packet processing system. The packet processing systems disclosed thereby allow for packets from a mobile user to be identified and sent to one or more common network tools, even though the mobile user moves within the communication system such that its user identification information changes. Thus, utilizing the embodiments disclosed herein, traffic associated with mobile users can be recognized and forwarded to the same load-balanced network tool port even though incoming port and user identification information may change within the communication system due to movement of the mobile user within the communication system. It is noted that while mobile user devices are primarily described herein, the user devices can be non-mobile user devices, as well, and the communication system can be any desired communication system. Further, the disclosed embodiments are useful for a wide variety of communication systems and related communication protocols. For some communication protocols, control information is located within control packets that are part of control plane communications, and these control packets are separate from data packets that are part of data plane communications. For other communication protocols, control information and data payloads are located within packets that are part of the same communication plane. Thus, the disclosed embodiments are useful for any desired communication protocol, whether or not there is a separate control plane for control packet communications. Different features and variations can be implemented, as desired, and related systems and methods can be utilized, as well.

In one embodiment, a packet processing system for forwarding network packets based upon user identification information is disclosed including one or more input ports configured to receive input packets associated with one or more user devices within a communication system, one or more output ports configured to receive forwarded packets and to output forwarded packets to one or more network analysis tools, a storage system configured to store binding records where the binding records identifying one or more output ports associated with user identification information for the one or more user devices, and packet processing circuitry. The packet processing circuitry is configured to extract user identification information from received input packets, to store extracted user identification information in the binding records, and to forward the input packets to the one or more output ports based upon the binding records. The packet processing system is further configured to identify communication system control information within the input packets, to extract identification change information for the one or more user devices from identified control information, and to update the binding records using the extracted identification change information.

In further embodiments, the one or more input ports are configured to be coupled to one or more passive packet monitoring systems that are coupled to one or more communication paths within the communication system. Still further, the packet processing system can further include a load balancer configured to load balance forwarded packets among two or more output ports. In a further embodiment, the input packets can include control packets configured to contain communication system control information and non-control packets. Still further, the input packets can be formatted using a tunneling protocol. In addition, in other embodiments, the one or more user devices can include one or more mobile user devices. Still further, the one or more mobile user devices can be configured to operate within a cellular communication network, and wherein the input packets comprises GPRS (general packet radio service) tunneling protocol (GTP) packets. Further, the GTP packets can be formatted using at least one of following protocols: GTP Version 0 (GTPv0), GTP Version 1 (GTPv1), and GTP Version 2 (GTPv2). Still further, the extracted user identification information can include at least one of the following: an IMSI (international mobile subscriber identifier), a GTP tunnel identifier, a GTP sequence number, a source IP address, a destination IP address, and a TEID (tunnel endpoint identifier).

In other embodiments, the packet processing circuitry can include one or more pre-processors coupled to the input ports, one or more post-processors coupled to the output ports, and switch circuitry configured to receive packets from the pre-processors and to forward packets to the post-processors. Further, each pre-processor can also be configured to add tags to input packets associated with a particular user device so that they are forwarded by the switch circuitry to one or more selected post-processors. In addition, each post-processor can be configured to remove tags added by the pre-processors so that original input packets are configured to be provided to the output ports.

In still further embodiments, the packet processing circuitry can be further configured to identify change request/response pairs within control packets for the communication system and to update user identification information within binding records only when a change request is approved. Still further, the one or more user devices can be one or more mobile user devices configured to operate within a cellular communication network, wherein the input packets comprises GPRS (general packet radio service) tunneling protocol (GTP) packets, and wherein the binding records comprise TEIDs (tunnel endpoint identifiers) and GTP sequence numbers.

In one embodiment, a method for forwarding network packets based upon user identification information including receiving input packets associated with one or more user devices operating within a communication system, extracting user identification information from the input packets, comparing the extracted user identification information with user identification information stored within binding records, creating binding records based on the extracted user identification record if matches are not found in the comparing step where the binding records including at least in part the extracted user identification information and one or more output ports associated with the user devices, identifying communication system control information within the input packets, extracting identification change information for the user devices from identified control information, updating the binding records using the extracted identification change information, and forwarding the input packets to the one or more tool ports based upon the binding records.

In further embodiments, the receiving step can include receiving input packets from one or more passive packet monitoring systems coupled to one or more communication paths within the communication system. Still further, the method can include load balancing forwarded packets among two or more output ports. In a further embodiment, the input packets can include control packets configured to contain communication system control information and non-control packets. Still further, the input packets can be formatted using a tunneling protocol. In addition, in other embodiments, the one or more user devices can include one or more mobile user devices. Still further, the one or more mobile user devices can be configured to operate within a cellular communication network, and wherein the receiving step comprises receiving GTP (GPRS tunneling protocol) packets. Further, the GTP packets can be formatted using at least one of the following protocols: GTP Version 0 (GTPv0), GTP Version 1 (GTPv1), and GTP Version 2 (GTPv2). Still further, the extracting step can include extracting user identification information using at least one of the following: an IMSI (international mobile subscriber identifier), a GTP tunnel identifier, a GTP sequence number, a source IP address, a destination IP address, and a TEID (tunnel endpoint identifier).

In still further embodiments, the forwarding step can include pre-processing the input packets to add tags associated with the binding records, and forwarding the tagged packets to the one or more output ports based upon the tags. Further, the forwarding step further can include post-processing the tagged packets to remove the tags, and outputting original input packets from one or more output ports. Still further, the identifying step can include identifying change request/response pairs within control packets and updating user identification information only when a change request is approved. In addition, the one or more user devices can include one or more mobile user devices configured to operate within a cellular communication network, and wherein the input packets comprises GPRS (general packet radio service) tunneling protocol (GTP) packets, and wherein the binding records comprise TEIDs (tunnel endpoint identifiers) and GTP sequence numbers.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed for mobile user identification and tracking for load balancing in packet processing systems. Packet processing systems are disclosed that are configured to receive packets associated with multiple mobile communication network users, to extract user identification information from the received packets, to store identity binding information for the mobile users, and to direct the packets associated with particular mobile users to one or more tool ports associated with the system. As such, packets from a single mobile user can be received and processed by one or more common network analysis tools. Further, the packet processing systems disclosed herein track changes in identification information for mobile users within a communication system by analyzing control information within packets for the communication system. When handover changes are made with respect to mobile users within the communication system, the disclosed systems track the change information within related control packets. Load balancing can also provided between a plurality of different network analysis tools using the mobile user identification and tracking information. Different features and variations can be implemented, as desired, and related systems and methods can be utilized, as well.

Utilizing the embodiments disclosed herein, traffic associated with users can be recognized and forwarded to the same load-balanced network tool port even though incoming port and user identification information may change due to movement of the user within the communication system. Thus, new traffic from the same user equipment that is received by the packet processing system from different tunnel sessions and/or input ports are forwarded to the same tool port or ports that the previous traffic from that user equipment had been forwarded. Advantageously, the user identification and tracking provided by the disclosed embodiments allows for traffic from the same user equipment to be provided to the same network analysis tool even though the user equipment moves within the communication system.

The user-based load balancing embodiments described herein work by spreading packets evenly to a number of egress or tool ports while keeping traffic from any given user on one or more common ports. To achieve this result, the packet processing system embodiments correlate received packets to specific users. This correlation is accomplished by extracting identification information from a packet and analyzing this identification information to determine the user device that generated the packets. A variety of fields within received packets can be used. For example, packet fields that can be used to provide this user identification information for GTP (GPRS tunneling protocol) packets include a tuple generated from the TEID (tunnel endpoint identification) and the outer destination IP address. This tuple can be used to uniquely identify which user equipment is the source for each packet received by the packet processing system. As described below, if this tuple information is not available, information from other fields within the packet can be used to identify the user device that was the source for the packet. In addition, to account for movement of mobile users within the communication system and associated changes in user identification information, such as TEIDs and IP addresses in GTP-based communications, control packets for the communication system are monitored to determine identification changes associated with mobile user devices. By tracking these changes, new packets from a mobile user device can still be provided to the same egress port or egress ports as prior packets, even if the identification information has changed for the mobile user device. It is further noted that with respect to GTP-based communications, one or more of different GTP protocols could be utilized including GTP Version 0 (GTPv0), GTP Version 1 (GTPv1), and GTP Version 2 (GTPv2). While GTP is the tunneling protocol described for packet communications within various embodiments described herein, other tunneling protocols could also be utilized for communication systems while still applying the advantageous user identification and tracking techniques described herein.

As indicated above, it is further noted that the disclosed embodiments are useful for wide variety of communication systems and related communication protocols. For some communication protocols, control information is located within control packets that are part of control plane communications, and these control packets are separate from data packets that are part of data plane communications. For other communication protocols, the control information and data payloads are located within packets that are part of the same communication plane. The disclosed embodiments are also useful for any desired communication protocol, whether or not it is a tunneling protocol and whether or not there is a separate control plane for control packet communications. Thus, the disclosed embodiments can be used with non-tunneling communication protocols and protocols that do not have separate control packets, if desired. Further, while mobile user devices are primarily described herein, the user devices can be non-mobile user devices, as well, and the communication system can be any desired communication system. Other variations could also be implemented as desired.

Figure 2A:
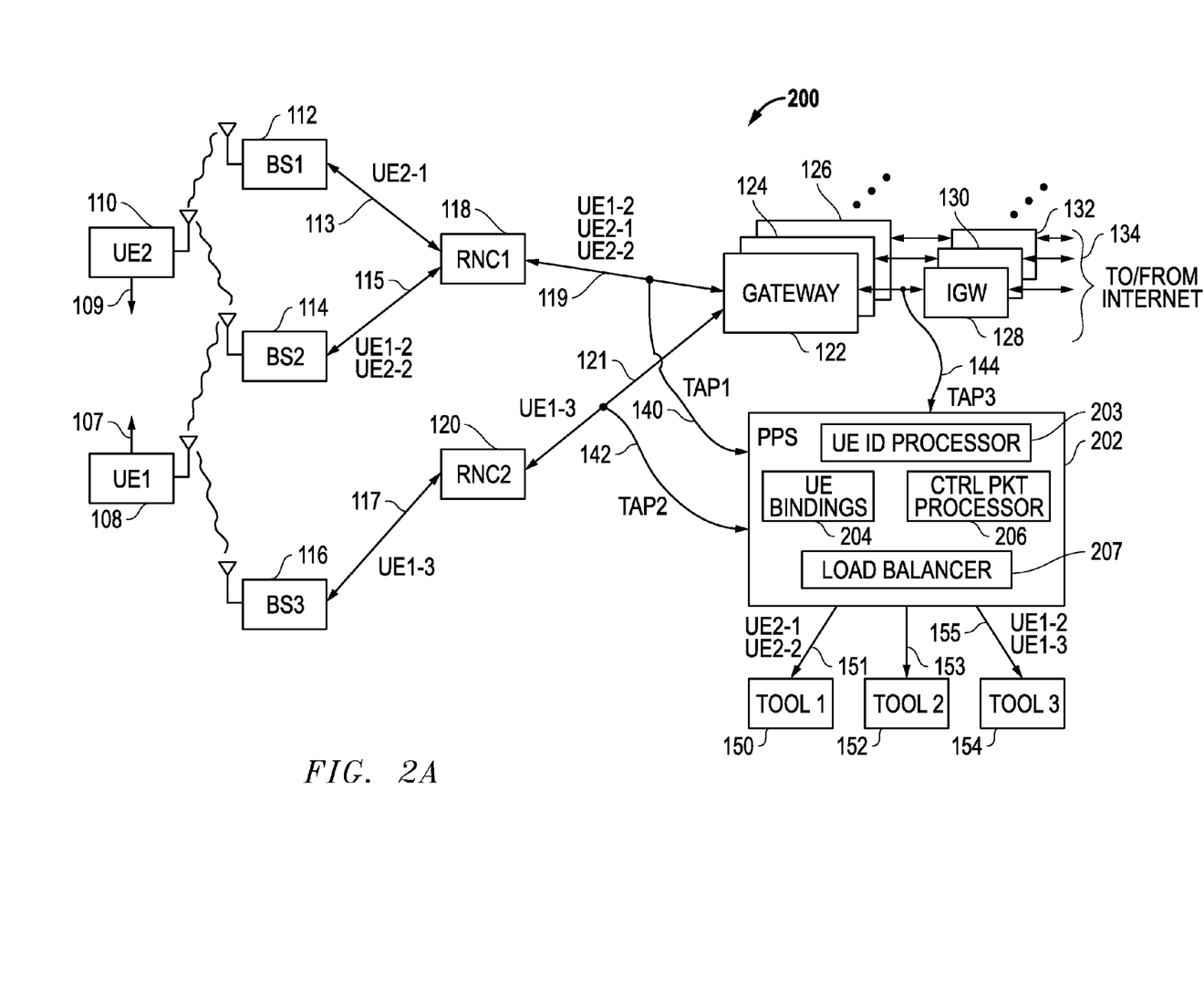
FIG. 2A is a block diagram of an embodiment for a communication system including a packet processing system having user identification tracking and related load balancing.

FIG. 2A is a block diagram of an embodiment 200 for a communication system having user identification tracking and related load balancing. For the embodiment depicted, a packet processing system (PPS) 202, such as a network tool optimizer (NTO) system, includes user equipment (UE) identification (ID) processor 203, UE bindings 204, control packet (CTRL PKT) processor 206, and load balancer 207. As described herein, the packet processing system (PPS) 202 analyzes incoming packets using the UE identification (ID) processor 203 and the control packet processor 206 to determine user equipment (UE) identification information, to establish and update session binding information, and to forward packets to destination tools. The system 202 uses the extracted UE identification information to generate UE-to-tool binding records within the UE bindings 204. These binding records correlate UE identification information with output ports so that incoming packets can be forwarded to the appropriate destination tools. Further, as UEs operate and move within the mobile communication system, the control packet (CTRL PKT) processor 206 tracks and analyzes control packets for the communication system to determine identification changes associated with the UEs. When changes occur, the UE bindings 204 are updated to account for the changes to UE identification information made within the communication system. The load balancer 207 operates to balance the packet traffic between network tools connected to the output ports for the packet processing system (PPS) 202, such as the first network tool (TOOL1) 150, the second network tool (TOOL2), and the third network tool (TOOLS) 154. Advantageously, the load balancer 207 utilizes the UE bindings 204 to send packets from a particular user device to the same load-balanced network tool, as described herein.

It is noted that embodiment 200 is similar to embodiment 100 in FIG. 1 (Prior Art) with respect to the communication system infrastructure depicted. Embodiment 200 also includes first user equipment (UE1) 108, second user equipment (UE2) 110, three base stations (BS1, BS2, BS3) 112/114/116, two radio network controllers (RNC1, RNC2) 118/120, a gateway 122, and an internet gateway (IGW) 128. As indicated above, the communication system can include different or additional base stations, radio network controllers, gateways, internet gateways and/or other additional infrastructure devices. For example, additional gateways 124 and 126 are depicted that can be connected to additional base stations and radio network controllers, and additional internet gateways 130 and 132 are also depicted that can be coupled to these additional gateways and the Internet 134. As with FIG. 1 (Prior Art), it is noted that FIG. 2 represents a simplified version of a mobile communication system, and many more interfaces and communication links would likely be tapped and/or monitored within the mobile communication system. It is further noted that while mobile user devices are depicted, the user devices could be non-mobile user devices, if desired. Further the communication system can be configured for mobile user devices, non-mobile user devices, or a combination of both, as desired.

In contrast with embodiment 100 of FIG. 1 (Prior Art), however, embodiment 200 does not require the use of the UE session off-line post-processor 160, as the UE source for packet streams are identified and tracked in real-time by the packet processing system (PPS) 202. In particular, by setting up binding records within the UE bindings 204 when new UE sessions are identified by the UE ID processor 203 and by monitoring communication system control packets using the control packet (CTRL PKT) processor 206, the system 202 is able to maintain real-time binding records to allow the forwarding of packets from a particular UE to one or more common load-balanced network tools, even when the UE identification information changes within the communication system. Thus, while the packet streams associated with UE1 108 and UE 110 in FIG. 1 (Prior Art) are received by different network tools through load balancer 102, the packets streams from UE1 108 and UE2 110 for embodiment 200 are received by the same network tool through packet processing system (PPS) 202. As depicted, the first network tool (TOOL1) 150 receives the packet streams UE2-1 and UE2-2 that are associated with UE2 110. The third network tool (TOOLS) 154 receives the packet streams UE1-3 and UE1-2 that are associated with UE1 110. The second network tool (TOOL2) 152 can then receive other packet streams, as desired. Thus, the packet processing system (PPS) 202 can still be configured to load balance packet streams among available network tools using load balancer 207, while identifying and tracking particular UE packets so that the same network analysis tools can receive packets from a particular UE, if desired.

It is noted that the communication connections described herein can be wired and/or wireless and can include one or more intervening communication devices or systems, as desired. It is further noted that filter rules provide forwarding instructions from input ports to output ports for the packet processing system (PPS) 202 based upon packet contents. For example, depending upon the contents of certain fields, such as address fields, within a packet, the packet may be forwarded to one or more destination ports that can be coupled to network analysis tools. While some filter rules will provide that all packets from a particular source be forwarded to one or more output ports, some filter rules will discard certain packets and only forward a subset of packets to the selected output ports. If desired, the system 202 can provide a user interface to allow users to configure desired forwarding rules for incoming packets.

Figure 2B:
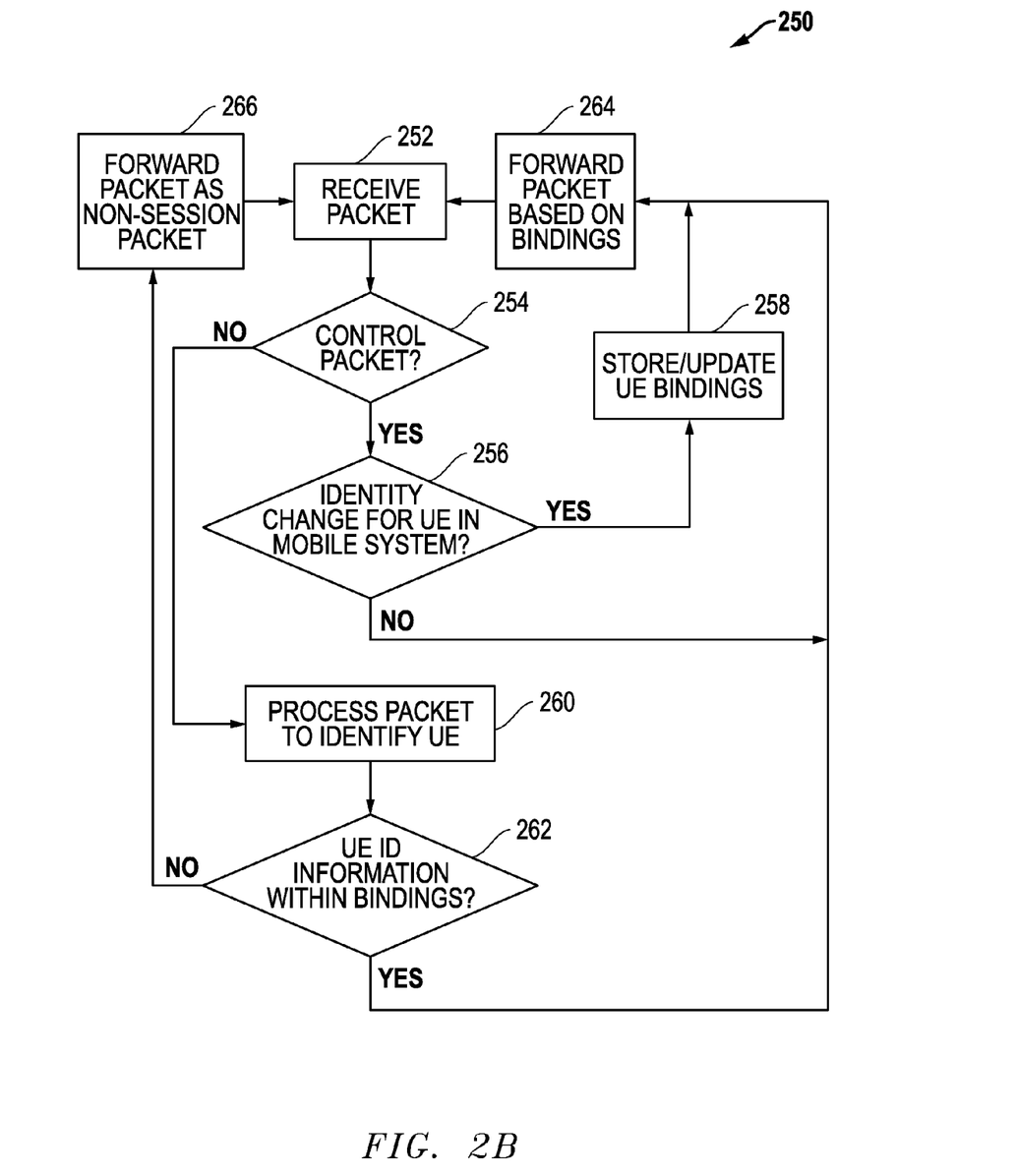
FIG. 2B is a process flow diagram of an embodiment analyzing packets to determine user equipment (UE) identification information, to store/update UE binding records, and to forward packets based upon UE-to-tool bindings.

FIG. 2B is a process flow diagram of an embodiment 250 for analyzing packets within the communication system to determine user equipment (UE) identification information, to store/update UE binding records, and to forward packets based upon UE-to-tool bindings. In block 252, a packet is received by the packet processing system (PPS) 202. In block 254, a determination is made whether the packet is a control packet. If "NO," then flow passes back to block 260. If "YES," then flow passes to block 256 where a determination is made whether identity information for a UE has changed within the communication system, including a determination if the UE is part of a new session. For example, UE identification information can change when identification information for a UE changes after a communication session has already been started. If "NO," then flow passes to block 264 where packets are forwarded based upon the UE-to-tool binding information as set forth in the UE binding records. If "YES," then flow passes to block 258 where the UE bindings are stored and/or updated for the UE according to the detected UE identification information. Flow then proceeds back to block 264. If the determination in block 254 is "NO," then flow passes to block 260 where non-control packets are processed to determine UE identification information. Next, in block 262, a determination is made whether UE identification information for the non-control packet is located within the binding records within the UE bindings. If "YES," then flow passes to block 264. If "NO," then flow passes to block 266 where the packet is forwarded as a non-session packet that is associated with an unrecognized session. As a further alternative, it is noted that non-control packets could analyzed, if desired, to determine UE identification information that is then utilized to update the binding records within the UE bindings. Other variations could also be implemented, as desired.

Figure 3:
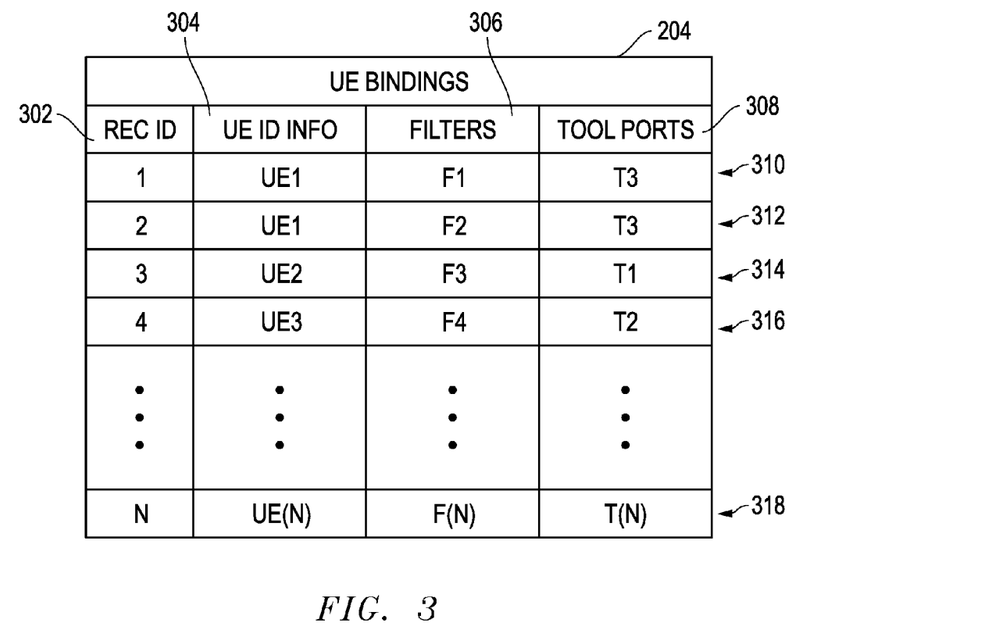
FIG. 3 is a block diagram of an embodiment for user equipment (UE) binding records.

FIG. 3 is a block diagram of an embodiment 300 for user equipment (UE) bindings 204. For the embodiment depicted, each binding record within the UE bindings 204 includes a record identifier (REC ID) 302, UE identification information (UE ID INFO) 304, filters 306, and destination tool ports 308. The UE bindings 204 can include any number of desired binding records and can include different and/or additional information, as desired. As depicted, a first record 310 includes UE identification information for UE1, includes filter F1 associated with this UE1 identification information, and includes destination tool port T3 for packets matching the filter rules. A second record 312 includes UE identification information for UE1, includes filter F2 associated with this UE1 identification information, and includes a destination tool port T3 for packets matching the filter rules. A third record 314 includes UE identification information for UE2, includes filter F3 associated with this UE2 identification information, and includes destination tool port T1 for packets matching the filter rules. A fourth record 316 includes UE identification information for UE3, includes filter F4 associated with this UE2 identification information, and includes destination tool port T2 for packets matching the filter rules. Finally, an Nth record 318 includes UE identification information for Nth user equipment UE(N), includes an Nth filter F(N) associated with this UE(N) identification information, and includes an Nth destination tool port T(N) for packets matching the filter rules. It is noted, as shown in FIG. 3, packets for a particular UE (e.g., UE1) are preferably bound to the same tool port (e.g., T3).

As described herein, therefore, internal session tables are used to store binding records that correlate a given UE to an egress or tool port. Further, state information of tunnels for a given user are also maintained, and change information is tracked as users move within the communication system. For example, outstanding request/response messages created using the GTP-C (GTP-control) protocol can be monitored and analyzed to determine changes in the identification information for user traffic.

Figure 4:
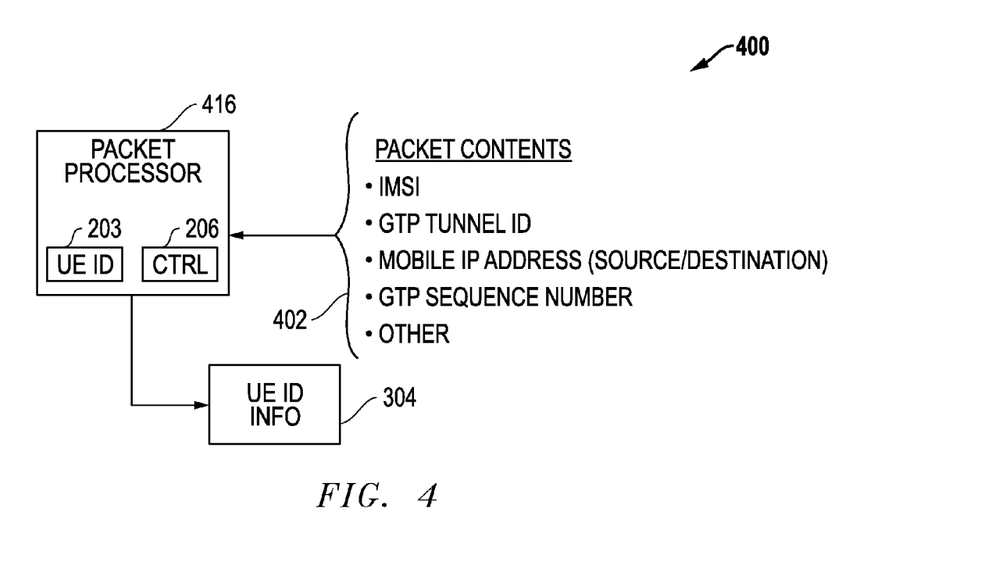
FIG. 4 is a block diagram of an embodiment for analyzing packet contents to determine user equipment (UE) identification information for UE binding records.

FIG. 4 is a block diagram of an embodiment 400 for analyzing packet contents to determine user equipment (UE) identification information for UE binding records. For the embodiment depicted, a packet processor 416 includes the UE identification (ID) processor 203 and the control (CTRL) packet processor 206. The packet processor 416 receives and analyzes contents 402 from one or more fields within a received packet. The fields utilized and analyzed for UE identification can include, for example, IMSI (International Mobile Subscriber Identity) information, GTP (GPRS tunneling protocol) tunnel IDs, mobile IP addresses including source IP address information and destination IP address information, GTP sequence numbers, and/or other information from fields within received packets. The packet processor 416 analyzes the packet contents 402 to determine UE identification information 304. This UE identification (ID) information 304 can then be used to store or update binding records within the UE bindings 204. As described herein, this UE identification (ID) information 304 can include identification changes for UEs caused by control packets for the communication system as the UEs move within the communication system. It is further noted, as described in more detail below, state tables can be used to store request/response pairs with respect to control packets. These request/response pairs are then tracked to prevent corruption of binding records in cases where handover requests are denied. In particular, updates to the binding records are done after confirmation of a handover request with a response that approves the request.

In contrast with prior solutions, the packet processing systems described here effectively provide user-based load balancing of monitored traffic coming from multiple network devices at the same time by identifying user traffic belonging to a single end device. Monitored traffic can include traffic from a wide variety of network devices including MME (mobility management entity) devices, GPRS (general packet radio service) support node (SGSN) devices, gateway GPRS support node (GGSN) devices, SGW (serving gateway) devices, PGW (packet gateway) devices, base station devices (e.g., ENodeB devices for LTE systems), and/or other network devices. Advantageously, the user-based load balancing described herein works in passive monitoring networks where packets flowing between two endpoints cannot be affected.

User identification correlation can be determined using a variety of techniques, as desired, and different techniques can be used for different packet protocols. As such, depending upon the available fields within a given packet, different fields can be used for UE identification. For example, the following TABLE 1 provides one example for fields that can be utilized for UE identification for various packet contents within GTP-based packets. Additional and/or different information could also be utilized, as desired, to identify UEs from packet contents. Once UE identification is determined, a binding record can be generated, stored, and/or updated that correlates the UE identification information to a particular tool or egress port, depending upon applicable filter rules.

TABLE 1

EXAMPLE UE IDENTIFICATION INFORMATION

| Order | Fields | UE Identification Information |
|---|---|---|
| 1 | TEID DIP | TEID and Destination IP (DIP) Address fields are used to identify the UE and to select the packet forwarding information. |
| 2 | IMSI | For packets that do not contain TEID/DIP information, IMSI information is used to identify the UE and to select the packet forwarding information. Examples are create session/PDP (packet data protocol) requests. |
| 3 | GTP Sequence Number | For packets that do not contain TEID, DIP, and IMSI information, the GTP sequence number can be used to provide UE correlation. All request/response pairs share a unique GTP sequence number. This GTP sequence number can be used to match a response to a request. The request message will have a TEID, and this TEID can be used to identify the UE within the lookup table. The forwarding information for this TEID is then stored together with the GTP sequence number. When a response message without TEID is received, it is matched with the stored GTP sequence number to provide UE identification. |

It is noted that TABLE 1 provides an example order for packets contents that are utilized in identifying UEs. First, the TEID and DIP fields are utilized. If the UE cannot be identified from TEID/DIP information (e.g., the packet does not contain this information), IMSI information within a packet is utilized. If the UE cannot be identified from the TEID/DIP information or the IMSI information (e.g., the packet does not contain this information), a GTP sequence number can be utilized. The resulting determination of the UE identify can be utilized to store and/or update UE binding records so that packets from the identified UE can be forwarded to one or more common output ports for the packet processing system. It is noted that LBI (linked bearer ID) and APN (access point name) information within GTP-based packets can be used to correlate multiple PDNs (public data networks) inside single user traffic data and can be utilized to tear down user sessions. Further, it is noted that different processing orders and packet contents could be utilized, as desired.

Figure 5:
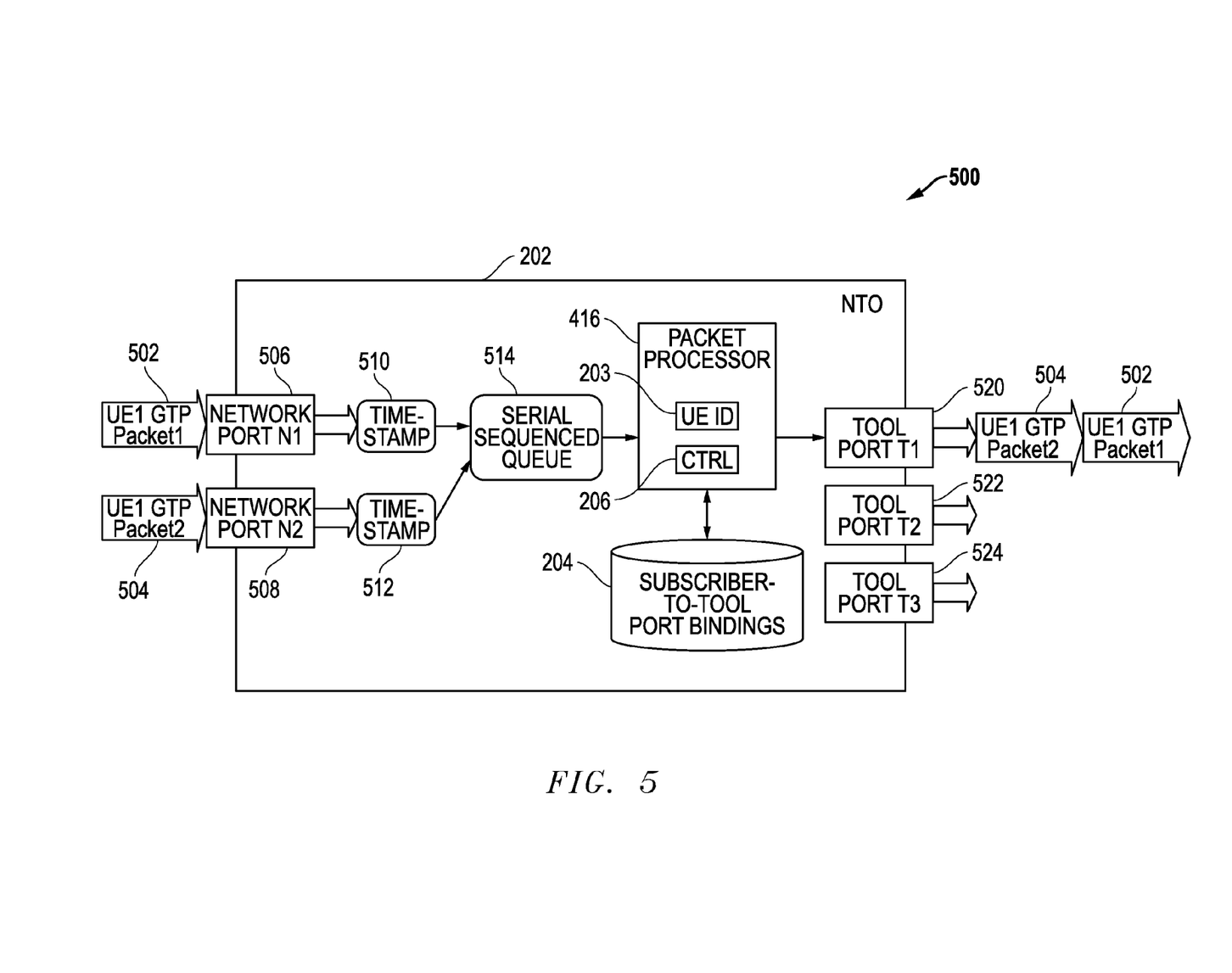
FIG. 5 is a block diagram of an embodiment for a network tool optimizer (NTO) system that utilizes a packet processor and binding records to identify multiple sessions for a single user.

FIG. 5 is a block diagram of an embodiment 500 for an NTO system 202 that is tracking packets for multiple sessions from a single user. The packets received by the NTO system 202 may be sourced from one or more passive monitoring system probes or taps that provide copies of packets associated with mobile communications. These probes and taps may be external devices associated with communication links that connect network elements, or they may be devices that are integrated within a network element, as desired. As described above, the monitored data packets may include control plane and/or user plane data. For example, the monitored data packets may be associated with 3GPP ($3^{rd}$ Generation Partnership Project) protocols and related interfaces (e.g. S1-C, S1-U, S3, S4, S5, S8, S11). The monitored data packets may also be associated with other network protocols/interfaces based on the GPRS (General Packet Radio Service) tunneling protocol (GTP), PMIP (Proxy Mobile Internet Protocol), and/or other mobile communication protocols. In one embodiment, the monitored packets may include control plane packets associated with EPC (Evolved Packet Core) signaling interfaces (e.g., S1-C, S1-U). Packets formatted using other packet protocols could also be monitored, if desired.

For the embodiment depicted, data plane and control plane packets associated with a GTP-based interface are received at a first network port 506 (N1) for the NTO 202, and data plane and control plane packets associated with another GTP-based interface are also received at a second network port 805 (N2) for the NTO 202. Packet 502 represents the GTP-based packets (PACKET1) received at the first network port (N1) 506. Packet 504 represents the GTP-base packets (PACKET2) received at the second network port (N2) 508. If desired, the received packets can be time-stamped using time-stamp processors 510 and 512, respectively, although it is noted that time-stamping could be removed. The incoming packets can then be provided to a queue 514 where they are serially sequenced for processing by the packet processor 416, although it is noted that the serial queuing could be removed, if desired. The packet processor 416 receives and processes the incoming packets, and the packet processor 416 can be configured to include the UE ID processor 203 and the control (CTRL) packet processor 206. The packet processor 416 uses the binding records within subscriber-to-tool port bindings 204 to forward incoming packets to the appropriate tool ports.

During operation, the packet processor 416 decodes and processes incoming packets to extract mobile user identifying information from the packets. Using the extracted mobile user identifying information, a check is then made to determine whether a tool port binding record has already been created for the mobile user. If a binding record has not yet been created, then one is created within the subscriber-to-tool port bindings 204. Each binding record within the subscriber-to-tool port bindings 204 identifies one or more tool ports to which packets associated with the mobile user equipment (UE) should be directed, according to the applicable filter rules, and also contains some or all of the extracted mobile user identifying information. The packet is then forwarded to one or more bound tool ports 520 (T1), 522 (T2), or 524 (T3), depending upon the applicable filter rules. If a tool port binding record already exists, then a check is performed to determine if the existing binding record includes all of the extracted mobile user identifying information. Extracted mobile user identifying information that is not already present in the binding record can then be added to the existing binding record or placed into a new binding record, if desired, so as to effectively update and enhance the correlation capability of the bindings 204. The packet is then forwarded to one or more bound tool ports 520 (T1), 522 (T2), or 524 (T3), depending upon the applicable filter rules. It is noted that if a mobile user is bound to multiple tool ports, then multiple copies of the packet are generated and forwarded to the multiple bound tool ports. It is further noted that the packet processor 416 can also implement the load balancing of received packets provided by load balancer 207, if desired. For example, packet processor 416 can select an output tool port for an identified UE based upon the relative packet loads being output through the tool ports so as to load-balance the packet processing.

Advantageously, by identifying particular UEs and by tracking the user identifying information as it changes within the communication system, packets from a single UE that are part of multiple different sessions due to movement or changes within the mobile communication system can still be identified as being associated with that UE. These packets can then be sent to the same tool port(s) for subsequent analysis by the same network analysis tool(s). For example, looking back to FIG. 5, the GTP-formatted packet 502 could be received through one base station, and the GTP-formatted packet 504 could be received through a second base station. However, both packet 502 and packet 504 are forwarded to the same tool port, which is the first tool port (T1) 520 for the embodiment 500.

It is again noted that the user identifying information for the user equipment (UE) can include a wide variety of information from which user identity can be determined. For example, for mobile user devices, mobile user identifying information may include, but is not limited to, a mobile IP address, an IMSI (International Mobile Subscriber Identity), a GTP tunnel ID, and/or a service flow tuple (e.g., tuple including flow label, source address and destination address). Other mobile user identifying information could also be utilized, as desired.

As described above, the control (CTRL) packet processor 206 operates to determine if a control plane packet has been received for a user. If so, the control packet processor 206 decodes the packets to extract the change information for the associate user equipment. For example, when a UE moves from one base station to another base station within a communication system, the source identification information for the UE will change. These changes are provided in control packets used by the communication system. Rather than simply forwarding these control packets to tool ports based upon the identification information within the packet or ignoring these control packets, the control packet processor 206 determines the changes made within these control packets to the UE identification information and makes appropriate updates to the bindings 204. Thus, as the first user equipment (UE1) moves from base station to base station and the identification information for UE1 changes, these changes are tracked and appropriate updates are made to the records for UE1 in the bindings 204. In this way, packets from UE1 are still sent to the same tool port (e.g., tool port (T1) 520) as prior UE1 packets, thereby allowing for analysis of the communication traffic involving UE1 by the same network tool that has received the prior UE1 packets. Without this tracking of identity change information as UE1 moves through the communication system, the NTO system 202 would not able to identify and send UE1 packets to the same tool port(s) for analysis by the same network analysis tool(s).

It is again noted that the disclosed embodiments are useful for wide variety of communication systems and related communication protocols. As such, the disclosed embodiments are useful for any desired communication protocol, whether or not there are separate control plane and data plane communications. Further, while mobile user devices are primarily described herein, the user devices can be non-mobile user devices or a combination of mobile and non-mobile user devices, as well. Still further, the communication system can be any desired communication system using any desired communication protocol or protocols for packet communications within the communication system.

Figure 6:
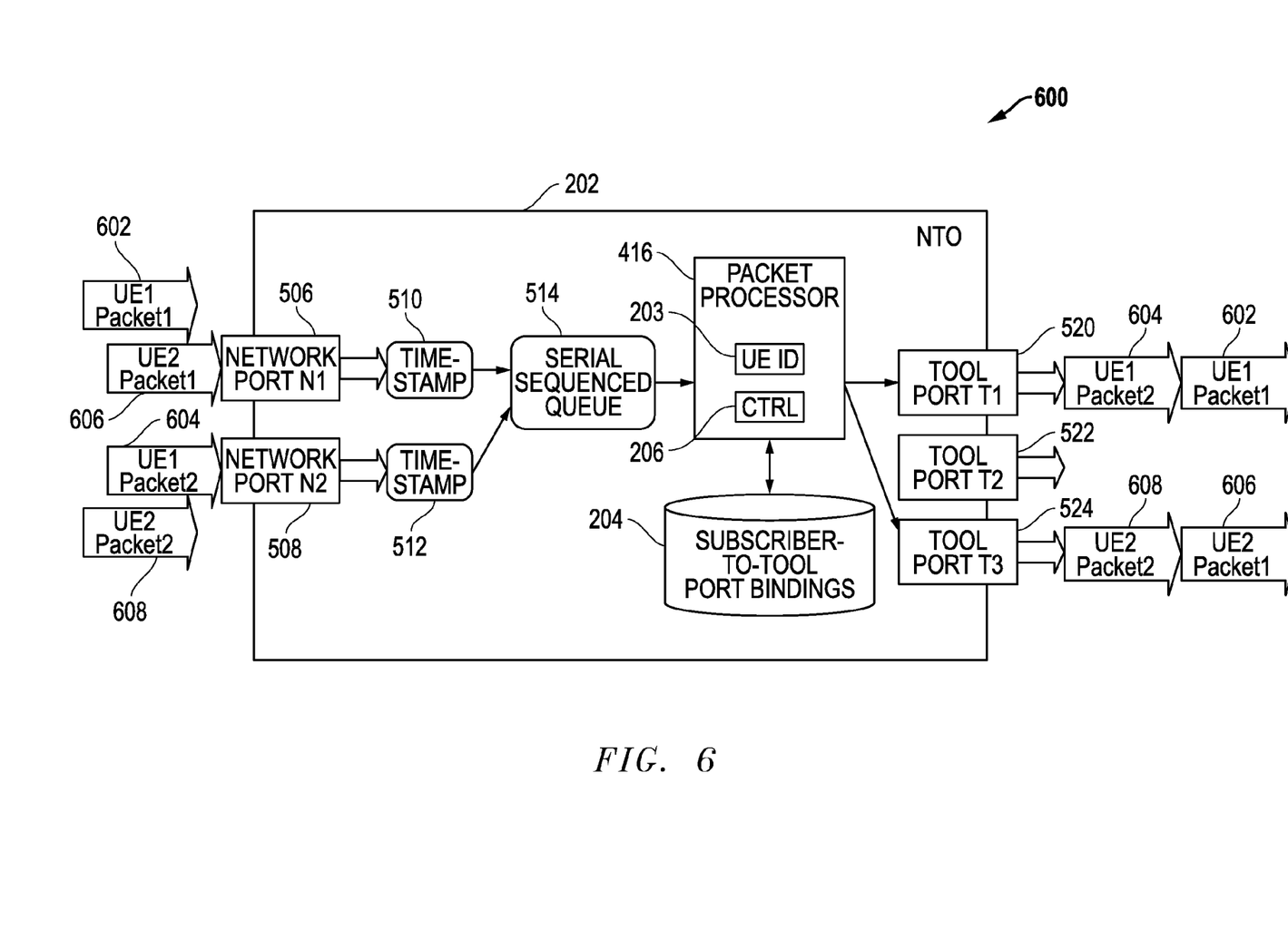
FIG. 6 is a block diagram of an embodiment for a network tool optimizer (NTO) system that utilizes a packet processor and binding records to identify multiple sessions for multiple users.

FIG. 6 is a block diagram of an embodiment 600 for an NTO system 202 where packets from multiple UEs are being identified and tracked. Embodiment 600 is similar to embodiment 500 except that packets from a second UE are also being processed. As depicted, packet (PACKET1) 602 represents packets being received from a first user equipment (UE1) at a first network port (N1) 506. Packet (PACKET2) 604 represents packets being received from UE1 at a second network port (N2) 508. Packet (PACKET1) 606 represents packets being received from a second user equipment (UE2) at the first network port (N1) 506. And packet (PACKET2) 608 represents packets being received from UE2 at the second network port (N2) 508.

As above, the packet processor 416 is configured to include UE identification (ID) processor 203 and control (CTRL) packet processor 206. The packet processor 416 operates to decode received packets in order to extract mobile user identifying information from the packets. A check is then made, using the extracted mobile user identifying information, to determine whether a tool port binding record has already been created for the mobile user. If a binding record has not yet been created, then one is created within the bindings 204. The packet is then forwarded to one or more bound tool ports 520 (T1), 522 (T2), or 524 (T3), depending upon the applicable filter rules. If a tool port binding record already exists, then a check is performed to determine if the existing binding record includes all of the extracted mobile user identifying information. Identifying information that is not already present in the binding records is then added to a binding record or to a new binding record, so as to effectively update and enhance the correlation capability of the binding records. The packet is then forwarded to one of the tool ports 520 (T1), 522 (T2), or 524 (T3), depending upon load balancing between the tool ports and depending upon any applicable filter rules. Typically, a single UE is not bound to multiple tool ports. However, if a mobile user were to be bound to multiple tool ports, then multiple copies of the packet are generated and forwarded to the multiple bound tool ports. It is again noted that the packet processor 416 can also implement the load balancing of received packets provided by load balancer 207, if desired. For example, packet processor 416 can select an output tool port for an identified UE based upon the relative packet loads being output through the tool ports so as to load-balance the packet processing.

Advantageously, by identifying particular UEs and by tracking the mobile user identifying information as it changes within the communication system, packets from multiple UEs that are received at different network ports can still be identified as being associated with a particular UE. As such, packets for a particular UE can be sent to the same tool port(s) for subsequent analysis by the same network analysis tool(s). For example, looking back to FIG. 6, the packets 602 and 604 from the first user equipment (UE1) can be identified as belonging to UE1, even though they are received at two different network ports (N1/N2) 506 and 508, respectively. As such, both packet 602 and packet 604 are forwarded to the same tool port, which is the first tool port (T1) 520 for the embodiment 600. Similarly, packets 606 and 608 from the second user equipment (UE2) can be identified as belonging to UE2, even though they are received at two different network ports (N1/N2) 506 and 508, respectively. As such, both packet 606 and packet 608 are forwarded to the same tool port, which is the first tool port (T1) 520 for the embodiment 600.

As described above, the control (CTRL) packet processor 206 operates to determine if a control plane packet has been received for mobile user. If so, the control packet processor 206 decodes the packets to extract the change information for the associate user equipment, and appropriate updates are made to the binding 204. Thus, as UE1 or UE2 moves from base station to base station and the identification information for UE1 or UE2 changes, these changes are tracked and appropriate updates are made to the records for UE1 and UE2 within the bindings 204. In this way, packets from UE1 are sent to the same tool port (e.g., tool port (T1) 520) as prior UE1 packets, and packets from UE2 are sent to the same tool port (e.g., tool port (T3) 524) as prior UE2 packets. This tracking and forwarding of UE packets to a common tool port allows for analysis of the communication traffic involving UE1 or UE2 by the same network tool that is receiving the prior UE1 or UE2 packets. Without this tracking of identity change information as UEs move through the mobile communications network, the NTO system 202 would not be able to identify and send packets for a particular UE to the same tool port for analysis by the same network analysis tool.

Figure 7:
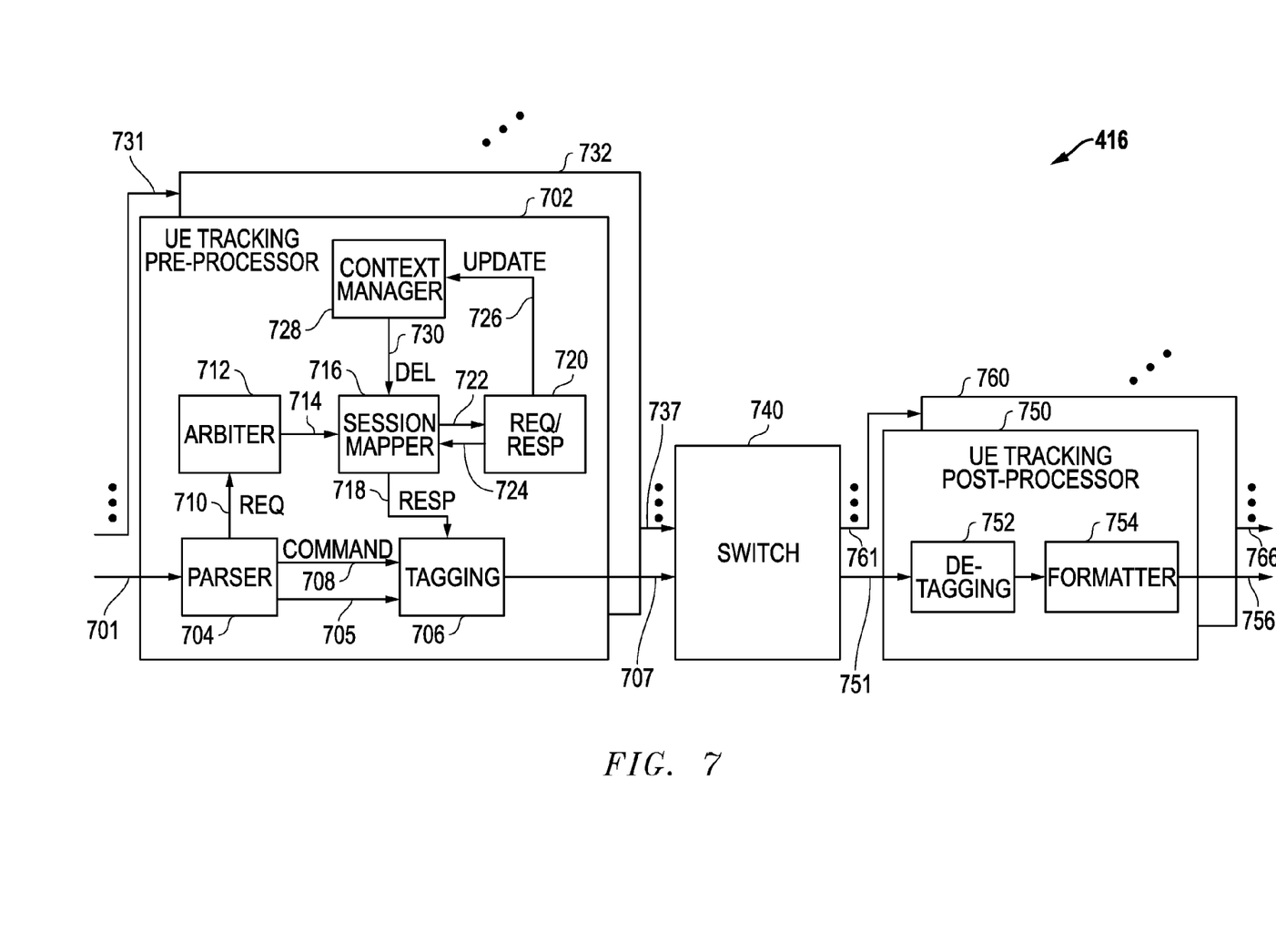
FIG. 7 is a block diagram of an embodiment for a packet processor configured to identify and track mobile user equipment (UE) for communication systems.

FIG. 7 is a block diagram of an embodiment for a packet processor 416 configured to identify and track mobile UE identification information for communications systems. As depicted, a switch 740 is coupled to pre-processors 702 and 732 and to two post-processors 750 and 760. While two pre-processors and two post-processors are depicted, it is noted that any number of pre-processors and post-processors can be used, as desired. Each pre-processor is coupled to an input port for the NTO system, and each post-processor is coupled to an output port for the NTO system. In particular, pre-processor 702 is coupled to an input port through communication path 701, and pre-processor 732 is coupled to a different input port through communication path 731. Post-processor 750 is coupled to an output tool port through communication path 756, and post-processor 760 is coupled to a different output tool port through communication path 766. The switch 740 can be one or more switch circuits that forward incoming packets from the pre-processors to the post-processors depending upon the contents of the packets, including tags added by the pre-processors as described below. As depicted, the switch 740 receives packets from pre-processor 702 through communication path 707 and from pre-processor 732 through communication path 737. The switch then forwards packets to post-processor 750 through communication path 751 and to post-processor 760 through communication path 761.

Looking now in more detail to the pre-processors, pre-processor 702 provides example functional blocks for UE tracking pre-processors. The incoming packets from communication path 701 are received by parser 704 and then provided through communication path 705 to the tagging block 706. The tagging block 706 adds tags to the packets so that they can be forwarded by the switch 740 to output tool ports based upon UE identification information, as described below. The tagging block 704 provides the tagged output packets to the switch 740 through communication line 707. Parser 704 also sends command (COMMMAND) signals through communication path 708 to tagging block 706 and sends request (REQ) signals 710 to the arbiter 712. The arbiter 712 communicates with the session mapper 716, which effectively operates as the UE identification (ID) processor 203 described above. The session mapper 716 communicates with the request/response block (REQ/RESP) block 720 through communication paths 722 and 724. The request/response block (REQ/RESP) block 720 effectively operates as the control packet (CTRL PKT) processor 206 described above. The context manager 728 receives update messages (UPDATE) from the request/response block (REQ/RESP) block 720 through communication line 726. The context manager 728 also sends delete commands (DEL) to the session mapper 716 through communication line 730.

Looking now in more detail to the post-processors, post-processor 750 provides example functional blocks for UE tracking post-processors. De-tagging block 752 receives tagged packets from the switch 740 and removes the tags inserted by the tagging block 706. The de-tagged packets are then re-formatted into their original form by formatter 754, as needed. The reformatted original packets are then output to a tool port through communication path 756.

As one example, during operation for GTP packets, the parser 704 parses incoming GTP packets and extracts UE identification information from selected fields within the GTP packets. As described above, these fields can be selected, as desired, and TABLE 1 above shows one example for fields that can be used for GTP packets. The parser 704 then sends the extracted information to the session mapper 716. The session mapper 716 uses the extracted UE identification information to look up session records within the bindings 204 to determine one or more egress or tool ports associated with the UE identification information. If a matching record is not found for the packet and the packet is a response packet, the session mapper 716 will wait for a port number to be received from the request/response (REQ/RESP) block 720. If the packet is a create request or a response with TEID fields, the TEIDs with the TEID fields will be added to the records within the UE bindings 204. Any completed request/response pair is forwarded to the request/response (REQ/RESP) block 720. If a response packet with a TEID of "0" is received, this packet is forwarded to request/response (REQ/RESP) block 720 to determine the port where the packet should be forwarded. Any other kind of packet is simply analyzed for UE identification information within its contents. If a UE match is found in the binding records within binding 204, the packet is forwarded to the appropriate tool port or ports. If no match is found, the packet can be declared as a non-session packet and can be forwarded to a non-session port for load balancing. Finally, once the output port for a packet is determined, a response (RESP) message is sent to the tagging block 706 with the tool port number found in the binding records or received from the request/response (REQ/RESP) block 720. The tagging block 706 then tags the packet so that it will be forwarded to the appropriate tool port or ports.

The request/response (REQ/RESP) block 720 operates to analyze request packets that are used in the control plane to change UE identification information within the communication system. If the received packet is a request, information within the packet is stored in a temporary table until the associated response packet is received. If the packet is a response packet with cause accepted, the packet information from the response packet is merged with the packet information already stored in the table from the request packet. The resulting combined information is then forwarded to the context manager 728. If the packet is a create response packet with cause reject, the information stored for the request packet is fetched from the local table, and the entry is deleted. This request information is also sent back to the session mapper 716 so that any entries added in the bindings 204 during the create message request can be removed. If the packet is a delete response packet with cause reject, the table entry for the request is deleted. If the response came in with TEID of "0," the request/response (REQ/RESP) block 720 will extract the outgoing port number from its tables and send this port number to the session mapper 716. The session mapper 716 also provides this port number to the tagging block 706 as a response (RESP) message using communication path 718. The tagging block 706 then tags the packet so that it will be forwarded to the appropriate tool port or ports.

The context manager 728 operates to fetch binding records for identified UEs, if they exist. If the packet is a create packet, the information received in the current packet is merged with existing information and put back in the binding record. If the packet is a delete packet, then TEIDs included in the delete packet are deleted. If there are remaining TEIDs, they are put back in the binding record. The information for the deleted TEIDs is also sent to the session mapper as delete (DEL) instructions through communication path 730 so that they can be deleted from the session table.

If desired, a mechanism can be used to keep the session table from overflowing when new TEIDs are created. To prevent the lookup table in session mapper 716 from overflowing, old unused entries are removed. A timer can be used to remove unused entries, if desired. Thus, when entries have not been accessed for a selected prior of time, they can be removed. The timer is used to determine how much time has passed from the last access.

The problem with this timed approach, however, is that some protocols (e.g., GTP version 2) allow a user to be idle for an indefinite period of time. As such, a timer base approach would remove a TEID that could still be active or made to be active. To address this concern, GTP control messages can be used to determine which TEIDs to keep stored in the table. Two different mechanisms can further be used to minimize the number of TEIDs to store. First, if a create request gets rejected, the TEIDs from the create message can be removed from the binding records. It is noted that TEIDs are added to the binding records when the create request is received because there are some circumstances where TEIDs are used to send user traffic before the response is received. If the corresponding response is later received with a cause of "reject," the TEIDs that were added to the binding records are removed. Second, TEIDs can be removed when a delete bearer or delete context is received. One difficulty with this approach, however, is that delete messages do not contain the TEIDs to be deleted. Instead, the TEIDs that should be deleted are indirectly referenced through other values (e.g., EBI, LBI, APN name, control TEID). To address this difficulty, a table can be used to store the required information. Each user has one entry in the table. The entry stores pointers to all TEIDs that are active for the user together with other information, such as the EBI, LBI, and APN name. When a delete message is received, the entry for the affected user is fetched from the table. The information in the message is combined with the table and used to determine which TEIDs should be deleted. The pointers are then used to remove the TEIDs from the binding records. Other variations could also be implemented, if desired.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A packet processing system for forwarding network packets based upon user identification information, comprising:
    one or more input ports configured to receive input packets associated with one or more user devices within a communication system;
    one or more output ports configured to receive forwarded packets and to output forwarded packets to one or more network analysis tools;
    a storage system configured to store binding records, the binding records identifying one or more output ports associated with user identification information for the one or more user devices;
    packet processing circuitry configured to extract user identification information from received input packets, to store extracted user identification information in the binding records, and to forward the input packets to the one or more output ports based upon the binding records; and
    a load balancer configured to load balance forwarded packets among two or more output ports;
    wherein the packet processing system is further configured to identify communication system control information within the input packets, to extract identification change information for the one or more user devices from identified control information, and to update the binding records using the extracted identification change information.

2. The packet processing system of claim 1, wherein the one or more input ports are configured to be coupled to one or more passive packet monitoring systems that are coupled to one or more communication paths within the communication system.

3. The packet processing system of claim 1, wherein the input packets comprise control packets configured to contain communication system control information and non-control packets.

4. The packet processing system of claim 3, wherein the input packets are formatted using a tunneling protocol.

5. The packet processing system of claim 1, wherein the one or more user devices comprise one or more mobile user devices.

6. The packet processing system of claim 5, wherein the one or more mobile user devices are configured to operate within a cellular communication network, and wherein the input packets comprises GPRS (general packet radio service) tunneling protocol (GTP) packets.

7. The packet processing system of claim 6, wherein GTP packets are formatted using at least one of the following protocols: GTP Version 0 (GTPv0), GTP Version 1 (GTPv1), and GTP Version 2 (GTPv2).

8. The packet processing system of claim 6, wherein the extracted user identification information comprises at least one of the following: an IMSI (international mobile subscriber identifier), a GTP tunnel identifier, a GTP sequence number, a source IP address, a destination IP address, and a TEID (tunnel endpoint identifier).

9. The packet processing system of claim 1, wherein the packet processing circuitry comprises one or more pre-processors coupled to the input ports, one or more post-processors coupled to the output ports, and switch circuitry configured to receive packets from the pre-processors and to forward packets to the post-processors.

10. The packet processing system of claim 9, wherein each pre-processor is configured to add tags to input packets associated with a particular user device so that they are forwarded by the switch circuitry to one or more selected post-processors.

11. The packet processing system of claim 10, wherein each post-processor is configured to remove tags added by the pre-processors so that original input packets are configured to be provided to the output ports.

12. The packet processing system of claim 1, wherein the packet processing circuitry is further configured to identify change request/response pairs within control packets for the communication system and to update user identification information within binding records only when a change request is approved.

13. The packet processing system of claim 12, wherein the one or more user devices comprise one or more mobile user devices configured to operate within a cellular communication network, wherein the input packets comprises GPRS (general packet radio service) tunneling protocol (GTP) packets, and wherein the binding records comprise TEIDs (tunnel endpoint identifiers) and GTP sequence numbers.

14. A method for forwarding network packets based upon user identification information, comprising:
    receiving input packets associated with one or more user devices operating within a communication system;
    extracting user identification information from the input packets;
    comparing the extracted user identification information with user identification information stored within binding records;
    creating binding records based on the extracted user identification information if matches are not found in the comparing step, the binding records including at least in part the extracted user identification information and one or more output ports associated with the user devices;

identifying communication system control information within the input packets;

extracting identification change information for the user devices from identified control information;

updating the binding records using the extracted identification change information;

forwarding the input packets to the one or more output ports based upon the binding records; and load balancing forwarded packets among two or more output ports.

15. The method of claim 14, wherein the receiving step comprises receiving input packets from one or more passive packet monitoring systems coupled to one or more communication paths within the communication system.

16. The method of claim 14, wherein the input packets comprise control packets configured to contain communication system control information and non-control packets.

17. The method of claim 16, wherein the input packets are formatted using a tunneling protocol.

18. The method of claim 14, wherein the one or more user devices comprise one or more mobile user devices.

19. The method of claim 18, wherein the one or more mobile user devices are configured to operate within a cellular communication network, and wherein the receiving step comprises receiving GTP (GPRS tunneling protocol) packets.

20. The method of claim 19, wherein GTP packets are formatted using at least one of the following protocols: GTP Version 0 (GTPv0), GTP Version 1 (GTPv1), and GTP Version 2 (GTPv2).

21. The method of claim 19, wherein the extracting step comprises extracting user identification information using at least one of the following: an IMSI (international mobile subscriber identifier), a GTP tunnel identifier, a GTP sequence number, a source IP address, a destination IP address, and a TEID (tunnel endpoint identifier).

22. The method of claim 14, wherein the forwarding step comprises pre-processing the input packets to add tags associated with the binding records, and forwarding the tagged packets to the one or more output ports based upon the tags.

23. The method of claim 22, wherein the forwarding step further comprises post-processing the tagged packets to remove the tags, and outputting original input packets from one or more output ports.

24. The method of claim 14, wherein the identifying step comprises identifying change request/response pairs within control packets and updating user identification information only when a change request is approved.

25. The method of claim 24, wherein the one or more user devices comprise one or more mobile user devices configured to operate within a cellular communication network, and wherein the input packets comprises GPRS (general packet radio service) tunneling protocol (GTP) packets, and wherein the binding records comprise TEIDs (tunnel endpoint identifiers) and GTP sequence numbers.

* * * * *